United States Patent
Hasselgruber

(10) Patent No.: US 6,322,132 B1
(45) Date of Patent: Nov. 27, 2001

(54) HINGED JOINT IN ROOF SYSTEMS OF VEHICLES WITH ADJUSTABLE ROOF

(75) Inventor: Andreas Hasselgruber, Eberdingen-Nussdorf (DE)

(73) Assignee: CTS Fahrzeug Dachsysteme GmbH, Korntal-Muenchingen (DE)

( * ) Notice: Subject to any disclaimer, the term of this patent is extended or adjusted under 35 U.S.C. 154(b) by 0 days.

(21) Appl. No.: 09/649,732

(22) Filed: Aug. 30, 2000

(30) Foreign Application Priority Data

Aug. 30, 1999 (DE) .............................. 199 41 087

(51) Int. Cl.⁷ ...................................................... B60J 7/08
(52) U.S. Cl. ..................................................... 296/122
(58) Field of Search ........................................ 296/122, 121

(56) References Cited

U.S. PATENT DOCUMENTS 5,342,128 * 8/1994 Gruber ................................ 384/203
5,364,191 * 11/1994 Gruber ................................ 384/203

FOREIGN PATENT DOCUMENTS

| 42 16 557  | 11/1993 | (DE) . |
| 42 16 559  | 11/1993 | (DE) . |
| 295 16 619 | 3/1996  | (DE) . |

* cited by examiner

Primary Examiner—Stephen T. Gordon
Assistant Examiner—Jason Morrow
(74) Attorney, Agent, or Firm—Crowell & Moring LLP

(57) ABSTRACT

A hinged joint in vehicle bodies is provided with a first bearing section and a second bearing section. The bearing sections are held together by a bearing pin. In order to be able to produce highly stressed hinged joints in the area of vehicle bodies using simple techniques for easy manufacturing and operational safety, at least one of the joint parts of the joint connection is provided with a low-friction surface coating to reduce the friction.

9 Claims, 1 Drawing Sheet

HINGED JOINT IN ROOF SYSTEMS OF VEHICLES WITH ADJUSTABLE ROOF

BACKGROUND OF THE INVENTION

This application claims the priority of German Application 199 41 087.9, filed Aug. 30, 1999, the disclosures of which are expressly incorporated by reference herein.

The present invention relates to a hinged joint in roof systems of vehicles with adjustable roof, and more particularly, to a hinged joint with first and second bearings held together by a bearing pin.

In movable roof systems for vehicles, for example folding tops for convertible vehicles, hinged joints are installed between hinged arms of the roof system frame as described in DE 295 16 619 U1. These joints consist of a bearing pin held on an articulated arm that is guided in a bearing seat of the other articulated arm. The quality of the hinged joints must satisfy high demands since the frame is exposed to high mechanical stress and the influences of weather and must have the same service life as the vehicle.

To reduce joint friction, the hinged joints are generally built in such a way that the bearing pin is surrounded by a bearing bushing that consists of a very low friction material, frequently with a PTFE coating. The bearing bushing thus provides for the bearing pin to move without friction in the bearing mount.

The bearing bushing increases the weight and the costs of the hinged joint. In addition, the manufacturing effort for the hinged joint increases disproportionately greatly with the number of hinged components. With an increasing number of hinged components, the risk also increases that during manufacturing or in operation one of the components will become dysfunctional because of mechanical stress. In particular, the plastic bearing bushings must be able to withstand fairly high bearing forces within permissible wear limits, which makes great care necessary with respect to material selection and manufacturing.

DE 42 16 557 A1 and DE 42 16 559 C2 disclose a ball element in a swivel bearing, which is supported against the housing of the swivel bearing by a guide ring, wherein a friction-reducing surface coating is provided on the surface areas of the ball element and guide ring that are turned toward each other. These documents do not give more specific data on the friction-reducing surface coatings with regard to material selection and thickness of the coating, in particular for use in adjustable vehicle roofs.

SUMMARY OF THE INVENTION

An object of the present invention to overcome the problem of designing highly stressed hinged joints in the area of vehicle bodies with simple means for easy manufacturing and operational safety.

This problem has been solved according to the present invention by providing that at least one of the joint parts of the hinged connection is provided with a low-friction surface coating of aluminum oxide with a thickness of at least 5 $\mu$m.

Because of the low-friction surface coating that is applied at least in the area of the sections on the surface that come into contact with each other of at least one of the interacting hinge parts, the joint friction is also greatly reduced even without the use of a bearing bushing. A bearing bushing in the joint can be eliminated which means that the number of components in the joint, and thereby the manufacturing and assembly effort, are decreased as well as the risk of a component failure.

It is sufficient to provide only one of the interacting hinged components with the coating; if necessary, the other component can also be designed without low-friction coating. In addition, it is sufficient to apply the coating only in the area of the joint sections that come into contact with each other; it is not absolutely necessary to provide the entire component, which is the carrier of a coated joint section, with a coating. In this way, various component sections can be assigned different surface characteristics within a body component that is equipped with a hinged section.

The surface coating according to the invention is suitable in a special way for use in roof systems of vehicles with adjustable roofs that can be adjusted between a closed position and open position using a convertible top frame whereby the convertible top frame comprises a number of bows that can fold together and spread apart which are linked to each other by hinged connections. The movable bows are preferably provided with the low-friction coating at least in the area of their hinged sections, while the bearing bushing that has been customary to date can be omitted. In spite of the relatively high mechanical stress during the transition between open and closed position, the hinge friction is drastically reduced by the non-negligible coating and the bearing forces, and the adjusting forces necessary for the adjustment are reduced as well as the wear being reduced.

An aluminum coating in a thickness of at least 5 $\mu$m is applied on one or both interacting hinged parts as a surface coating. The surface coating can be applied, e.g. by a plasma-spray process or using a cathodic immersion painting on the frame.

It may be sufficient to coat only one of the two hinged parts that are in contact, whereby both a coating of the bearing pin on one of the hinged parts as well as a coating of the pin seat on the opposite hinged part are considered. The reduction in friction on a component is basically adequate to be able to eliminate additional measures like the use of bearing bushings.

Because of the coating, the coefficient of friction between the interacting hinged components can advantageously be reduced to a value less than 0.3, and in particular less than 0.1 and if necessary Less than 0.05. Because of the reduction in the coefficient of friction, an additional effect (besides the low wear) in the form of reduced level of the forces required for adjustment is obtained so that drives with smaller dimensions are adequate for making the adjusting movements.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
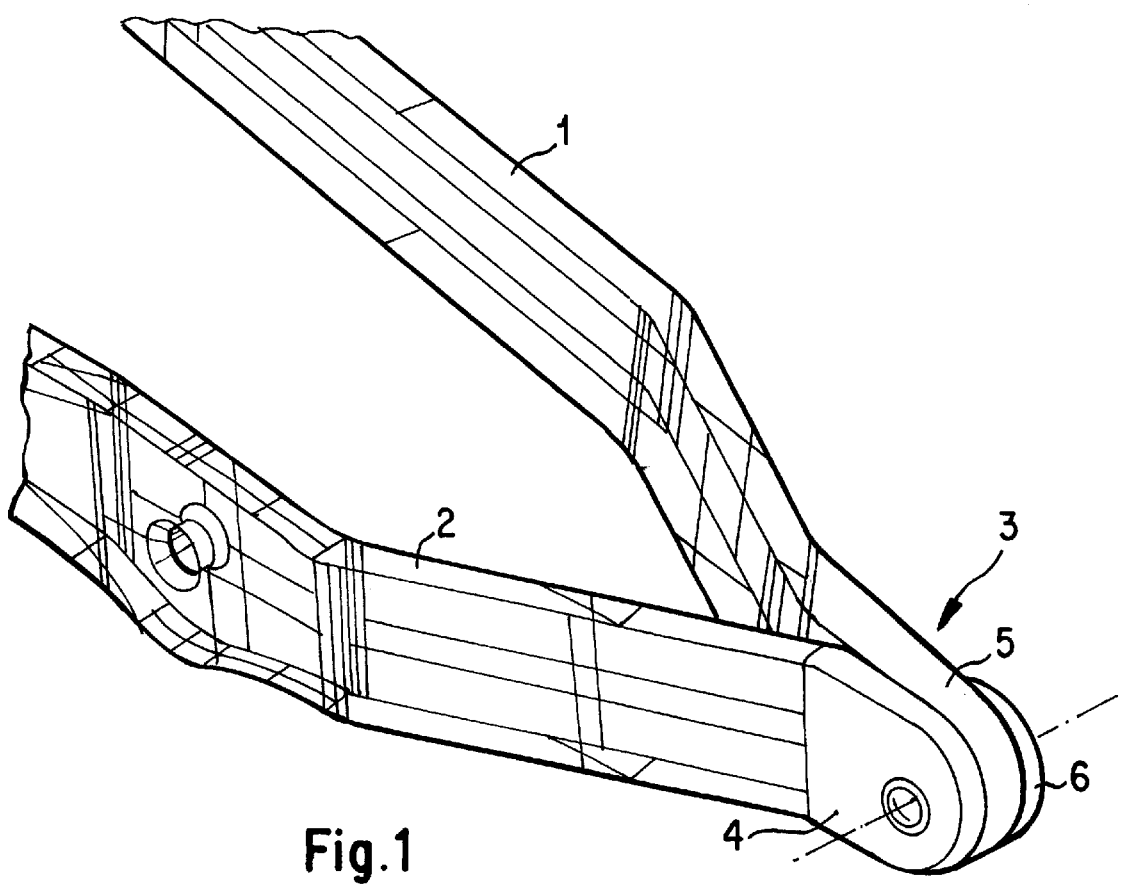
FIG. 1 is a perspective view of two roof bows that are linked to each other by a connecting hinge.
Figure 2:
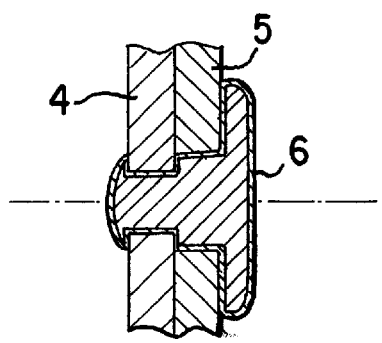
FIG. 2 is a cross-sectional view through the connecting joint shown in FIG. 1.

The roof bows 1, 2 shown in FIG. 1 are part of a generally known roof system of a motor vehicle that can be adjusted between closed and open positions which, for example, is used as a folding top and can comprise a top frame with a top cover lying on it. A hinged joint 3 is provided between the roof bows 1, 2 which permits a relative rotation between the two roof bows and has two bearing sections 4, 5 that are each assigned to one of the roof bows 1, 2, especially designed as a unit with the end sections of the respective roof bow. A hole is placed in each bearing section 4, 5 and holds a bearing pin 6 that connects the two bearing sections 4, 5. The two holes that have diameters that differ from each other (see FIG. 2) have the function of pin seats.

To reduce the friction, at least one of the components of the joint hinge and/or the connecting joint 3 that takes part in the relative movement has a friction-reducing surface coating. The surface coating can either be applied to one or to several or all of the components involved in the relative movement. The surface coating consists of a coating with especially low friction that is applied in a spraying or immersion procedure or in another procedure, for example an aluminum oxide layer that preferably has a thickness of at least 5 $\mu$m and a friction coefficient of maximum 0.3, effectively maximum 0.1 and in particular maximum 0.05. The reduction in the coefficient of friction is advantageously achieved by a homogeneous, fine-grained structure of the coating.

An aluminum oxide coating on the components can be created, for example, by first applying a pure aluminum coating which then is anodized so that the aluminum layer is converted into an aluminum oxide conversion layer.

In addition, the surface coating has other advantageous properties like adequately high corrosion resistance, impact resistance and hardness.

The bearing pin 6 can be provided with the low-friction coating whereby in this case a coating of the pin receivers in the bearing sections 4, 5 can be omitted. In this embodiment, a thrust washer is mounted between the roof bows and/or arms 1, 2.

In another embodiment, the pin seats in the bearing sections 4, 5 are covered with the coating; the bearing pin 6 is nickel coated.

In each such embodiment described above, it is ensured that a low-friction coating is applied between two components of the connecting joint that are in contact with each other and carry out a relative movement. As can be seen in particular in FIG. 2, the bearing pin 6 can be riveted in the seats of the bearing sections 4, 5.

In yet another advantageous embodiment, it can be advantageous to coat the roof bow, designed as a unit with the bearing sections 4, 5, completely with the low-friction coating so that even areas outside the bearing sections are provided with the coating. In addition, all components of the connecting joint can also be provided with the low-friction coating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Hinged joint in an adjustable roof system of a motor vehicle, comprising a first bearing section, a second bearing section, and a bearing pin configured to hold the bearing sections together in a hinged connection, wherein the first and second bearing sections and the bearing pin comprise joint parts, and at least one of the joint parts is provided with a low-friction surface coating of aluminum oxide having a thickness of at least 5 $\mu$m.

2. Hinged joint according to claim 1, wherein the coating is substantially in areas of the joint parts which contact each other.

3. Hinged joint according to claim 1, wherein only one of the joint parts which contact each other and move relative to each other is provided with the surface coating.

4. Hinged joint according to claim 1, wherein at least one of the bearing sections has a bearing hole which is low-friction coated surface.

5. Hinged joint according to claim 1, wherein the bearing pin is low-friction coated surface.

6. Hinged joint according to claim 1, wherein a shroud surface of the bearing pin is directly in contact with a bearing hole surface.

7. Hinged joint according to claim 1, wherein the surface coating has a maximum coefficient of friction of maximum 0.3.

8. Hinged joint according to claim 1, wherein the bearing sections are configured to be moveable with respect to a body of the vehicle.

9. Hinged joint according to claim 1, wherein the hinged connection is arranged in an adjustable convertible top cover for a vehicle roof system.

* * * * *